US011024023B2

(12) United States Patent
Coker et al.

(10) Patent No.: US 11,024,023 B2
(45) Date of Patent: Jun. 1, 2021

(54) INSPECTION SYSTEM

(71) Applicant: Vision Guided Robotics LLC, Pinckney, MI (US)

(72) Inventors: Dave Coker, Waterford, MI (US); Shawn Hunt, Pinckney, MI (US); Nelson D'Agostini, New Baltimore, MI (US)

(73) Assignee: Vision Guided Robotics LLC, Pinckney, MI (US)

( * ) Notice: Subject to any disclaimer, the term of this patent is extended or adjusted under 35 U.S.C. 154(b) by 0 days.

(21) Appl. No.: 16/687,774

(22) Filed: Nov. 19, 2019

(65) Prior Publication Data
US 2020/0160498 A1    May 21, 2020

Related U.S. Application Data

(60) Provisional application No. 62/769,031, filed on Nov. 19, 2018.

(51) Int. Cl.
| *H04N 5/235* | (2006.01) |
| *G06T 7/00* | (2017.01) |
| *G06T 7/80* | (2017.01) |
| *H04N 9/67* | (2006.01) |

(52) U.S. Cl.
CPC .............. *G06T 7/001* (2013.01); *G06T 7/80* (2017.01); *H04N 5/2351* (2013.01); *H04N 9/67* (2013.01); *G06T 2207/10024* (2013.01); *G06T 2207/20081* (2013.01); *G06T 2207/30168* (2013.01)

(58) Field of Classification Search
CPC ........ H04N 5/2351; H04N 9/67; G06T 7/001; G06T 7/80; G06T 2207/10024; G06T 2207/20081; G06T 2207/30168
USPC .......................................................... 348/93
See application file for complete search history.

(56) References Cited

U.S. PATENT DOCUMENTS

| 6,901,163 | B1 * | 5/2005 | Pearce ...................... B07C 5/36 382/165 |
| 2007/0116328 | A1 * | 5/2007 | Sablak ............... G06K 9/00771 382/103 |
| 2008/0094474 | A1 * | 4/2008 | Pierce .................. H04N 17/002 348/188 |
| 2008/0226148 | A1 * | 9/2008 | Gu ........................ G06T 7/0002 382/128 |
| 2015/0010231 | A1 * | 1/2015 | Sharma ................ G06K 9/4642 382/165 |
| 2017/0333134 | A1 * | 11/2017 | Wollowick ............. A61B 6/563 |
| 2019/0095719 | A1 * | 3/2019 | Brown ............... G06K 9/00771 |

\* cited by examiner

*Primary Examiner* — Michael Lee
(74) *Attorney, Agent, or Firm* — The Dobrusin Law Firm, PC

(57) ABSTRACT

A system for improving inspection systems is provided. The system generally includes a camera in communication with a processor. The camera is configured to capture an image for inspection of an object A to be inspected. The camera transfers the image to the processor for comparison with a reference image. If the comparison is not within a predetermined range, then the camera settings are adjusted and a new image is taken until the current image matches the reference image. Alternatively, or in addition to, the system is capable of learning based on a plurality of data and creating a model image for comparison prior to capturing the first image.

6 Claims, 2 Drawing Sheets

INSPECTION SYSTEM

CROSS REFERENCE TO RELATED APPLICATIONS

The application claims priority and benefit to U.S. provisional application Ser. No. 62/769,031 filed on Nov. 19, 2018, which is incorporated herein by reference.

TECHNICAL FIELD

The present specification generally relates to an inspection system for inspecting products on a production line. More specifically, the present specification relates an inspection system using a sensor, reference image and controlling sensor settings to optimize inspection of a specific product on an assembly line.

BACKGROUND

Assembly line inspection systems using sensors are known in the art. However, currently known systems do not compensate for changes in environmental light surrounding the systems. If a building is lighted by natural light, changes in day may disrupt the lighting of the sensor. These issues may arise if the inspection system is located near a door or a window. Furthermore, if people or objects interfere with the path of the ambient light within a building used to light an object to be inspected, problems with inspection may arise.

If a shadow is created on the object to be inspected, the light is low and/or the light is too high, then the inspection system may give a false positive or a false negative when inspecting the object. For example, if a person walks by the sensor at the moment an object is being inspected, then a shadow may be created on the object being inspected. This could lead to a false negative of a defective part thus leading to the part being unnecessarily discarded.

Accordingly, a need exists for an improved inspection system.

SUMMARY

A system and corresponding flow chart depicting the improved inspection system is described herein and along with the accompanying embodiments. The system generally includes a camera in communication with a processor. The camera is configured to capture an image for inspection of an object A to be inspected. The camera transfers the image to the processor for comparison with a reference image. If the comparison is not within a predetermined range, then the camera settings are adjusted and a new image is taken. Alternatively or in addition to, the system is capable of learning based on a plurality of data and creating a model image for comparison prior to capturing the first image.

An automated inspection apparatus is described herein including a camera configured to capture images of items, a processor in communication with the camera, a histogram matching portion having a reference image, the reference image taken by the camera in optimal lighting conditions, the histogram matching portion converting the image from RGB colorspace to HSV, wherein the camera taking a current image of the item to be inspected, the histogram matching portion converting the image from RGB to colorspace to HSV, the current image compared to the reference image, if the current image is equal to or within a predetermined range of the reference image, then the inspection proceeds forward, if the current image is not within the predetermined range of the reference image, then the image is retaken. The camera is positioned either above or adjacent to a conveyor belt so as to capture said images of said items.

Another embodiment provides for an automated inspection process using machine learning comprising the steps of storing and processing a plurality of data relating to a camera and/or image processing, generating by the camera a model image of an item to be inspected prior to taking a first image, determining if the model image is within a predetermined range, adjusting the camera settings to match a reference image, and taking a first image based on the model image. The plurality of data may include prior camera setting data, weather data, lighting data, time of day data, and/or third party data.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
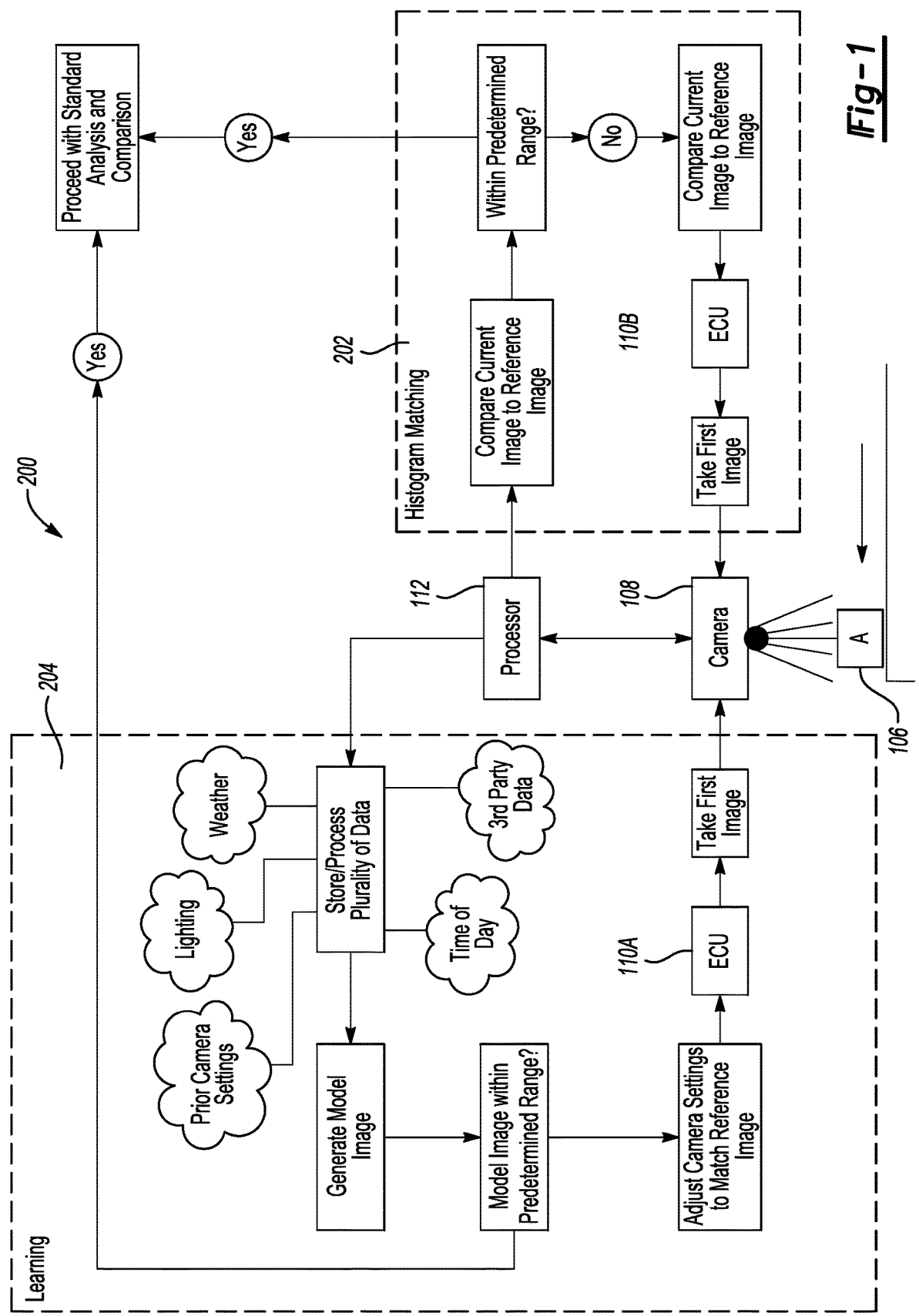
FIG. 1 depicts a system diagram and corresponding flow chart of various embodiments of the present inspection system according to one or more embodiments shown and described herein

FIG. 1 generally depicts a system and corresponding flow chart depicting the improved inspection system of the present specification. The system generally includes a camera in communication with a processor. The camera is configured to capture an image for inspection of an object A to be inspected. The camera transfers the image to the processor for comparison with a reference image. If the comparison is not within a predetermined range, then the camera settings are adjusted and a new image is taken. Alternatively or in addition to, the system is capable of learning based on a plurality of data and creating a model image for comparison prior to capturing the first image.

Referring now to FIG. 1, a system 200 is provided having both a histogram matching approach and a machine learning approach, referred respectively as 202, 204. The system 200 may have either or both a histogram matching approach 202 and/or the machine learning 204. The two approaches may be used separately or together to enhance the results and are preferably used together if the time allotted for inspection allows.

The histogram matching 202 takes a reference image with the optimal lighting conditions where the part being inspected is clearly visible. The histogram matching 202 then converts the image from the RGB colorspace to HSV (hue, saturation, and value). The image is converted to the HSV colorspace since it better isolates the intensity values of the image from the color components of the object being inspected. Once the intensity values have been identified, they are loaded into a histogram and saved.

The same process is performed with the current image, which is to be compared to the reference image. The current image is converted to an HSV and the intensity values are loaded into a histogram. The histogram is then matched and compared to the reference histogram using correlation as a metric. A perfect match between the reference image and the current image is 1.0. If there is not a match, or if a match is within some predetermined threshold, the gain and exposure of the camera 108 is modified until there is a good match.

As illustrated in FIG. 1, the histogram matching includes the process where a camera 108 takes an image of the object 106 to be inspected. Prior to inspection, the camera 108 takes an image, specifically the reference image, of the object 106 to be detected. During normal inspection, the same camera 108 takes the current image of the object 106 to be inspected.

The camera 108 then communicates with the processor 112. The processor 112 may be a computer or other device capable of processing and comparing the reference image to the current image. The histogram matching 202 includes the first step of comparing the current image to the reference image. As discussed above, the current image and the reference image are both converted to HSV to better isolate the intensity values of the image from the color components. The histogram matching then determines if the current image is within a predetermined threshold or range based on a comparison of the two images (or colorspace data points). If the current image is equal to or within the predetermined range of the reference image, then the inspection proceeds forward. If the current image is not within the predetermined range as compared to the reference image, then the camera settings are adjusted to match the reference image.

In an effort to match the reference image, the camera settings may be adjusted to compensate for extra or a lack of light within the building. The camera 108 has various settings that may be adjusted including the exposure, gain, brightness, and/or color.

An electronic control unit 110B is configured to communicate directly to the camera 108 to adjust said camera settings. A second image, specifically a second reference image, is taken using the adjusted camera settings. The processor 112 then restarts the process where the second current image is compared to the reference image.

Data regarding the comparison of the current image to the reference image is immediately sent to a data storage unit or cloud resulting in learning of the system 200. Data sent to the cloud may include specific settings with respect to a certain time of day, weather data, general lighting within the building determined by a sensor and/or time of year based on daylight saving or total available light during the day. This data may be used and incorporated with the histogram matching 202 and/or used with the learning 204.

The machine learning 204 approach uses a plurality of data from various sources to determine the appropriate camera settings prior to taking a first reference image. A cloud or other data storage unit stores a plurality of data relating to prior camera settings, lighting, weather, time of day, time of year and/or third party data. The processor 112 generates a model image in accordance with said enumerated data. The processor 112 then determines if the model image is within the predetermined range as compared to the reference image. This process is conducted without first taking a current image.

The processor 112 creates a theoretical model image to compare to the standard reference image. If the processor 112, based on the HSV comparison, determines that the model image is not within the predetermined range, then the camera settings of the camera 108 are adjusted prior to taking the first image.

An electronic control unit 110A controls the exposure, gain, brightness, and/or color of the camera 108 prior to taking the first image. The image is then take by the camera 108 of the object 106 to be inspected. The current image created based off of the learning approach is then processed through the histogram matching 202, if time allows. The process continues by comparing the current reference image based off of the machine learning 204 to the reference image to determine if the HSV colorspace is within the predetermined range.

The machine learning 204 also uses the HSV colorspace to build the statistical model by modifying the gain and exposure settings on the camera 108 and extracting various features of the image. The machine learning also uses CILAB color space (also referred to as LAB), such as shown below. LAB expresses color as three values: L* for the lightness from black (0) to white (100), a* from green (−) to red (+), and b* from blue (−) to yellow (+). LAB is an alternative means to represent an image, similar to RGB or HSV, and is arguably a closer representation as to how human perceive color. LAB keeps luminosity and color separate. The L channel captures the luminosity while a and b capture the color: a covers green to magenta and b does blue to yellow. By throwing in several colorspaces, especially in the machine learning side, sometimes the algorithms pick up on details that aren't there in the RGB or HSV representation. The features to be compared are enumerated below in Table 1:

TABLE 1

Features used in the machine learning algorithm
Feature

Mean of the RGB Blue plane
Mean of the RGB Green plane
Mean of the RGB Red plane
Mean of the RGB plane
Mean of the LAB L plane
Mean of the LAB A plane
Mean of the LAB B plane
Mean of the LAB plane
Mean of the HSV Hue plane
Mean of the HSV Saturation plane
Mean of the HSV Value plane
Mean of the HSV plane
Standard deviation of the RGB blue plane
Standard deviation of the RGB green plane
Standard deviation of the RGB red plane
Standard deviation of the HSV hue plane
Standard deviation of the HSV saturation plane
Standard deviation of the HSV value plane
Standard deviation of the LAB L plane
Standard deviation of the LAB A plane
Standard deviation of the LAB B plane
Variation of the RGB blue plane
Variation of the RGB green plane
Variation of the RGB red plane
Variation of the HSV H plane
Variation of the HSV V plane
Variation of the HSV V plane
Variation of the LAB L plane
Variation of the LAB A plane
Variation of the LAB B plane Table 1 above enumerates a plurality of filters that are compared during the comparison step. The filters are compared or overlaid to determine if there are differences between them.

In the machine learning 204 configuration, the system requires an initial training phase where the algorithm controls the gain and exposure settings on the camera and extracts the required features. The features are then fed into the machine learning algorithm where the plurality of data is stored in order to build an appropriate model that details the given camera settings based on what the current image will look like. When the algorithm is running, the algorithm takes as input the reference image and the current image from the camera, uses the model to determine at what gain an exposure settings the input image looks like and then changes the gain and exposure settings so that the reference image and the current image will match.

Figure 2:
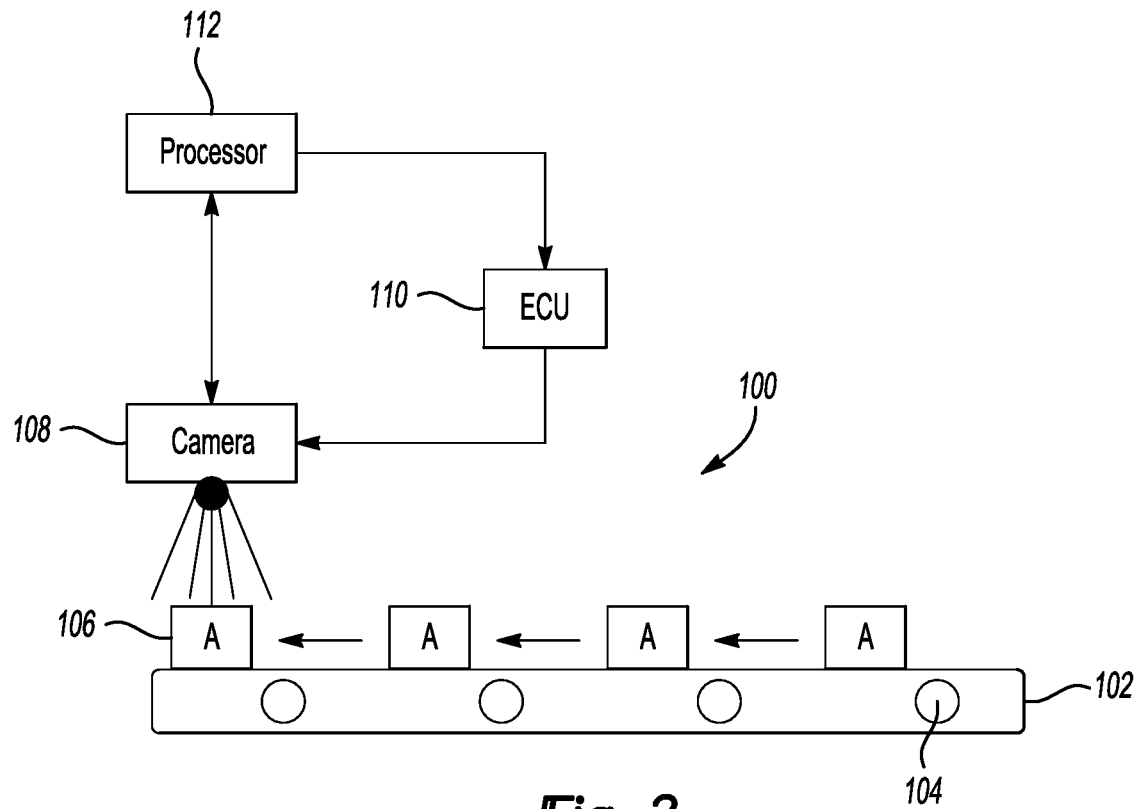
FIG. 2 depicts a generalized apparatus and assembly of the inspection system with a downward facing camera according to one or more embodiments shown and described herein.

FIG. 2 generally depicts one embodiment of a system 100 including a conveyor 102 having a plurality of rollers 104 to move the objects 106 forward for inspection. The inspection system generally includes a camera 108 in communication with an electronic control unit (ECU). A processor 112 is in communication with both the ECU 110 and the camera 108.

Figure 3:
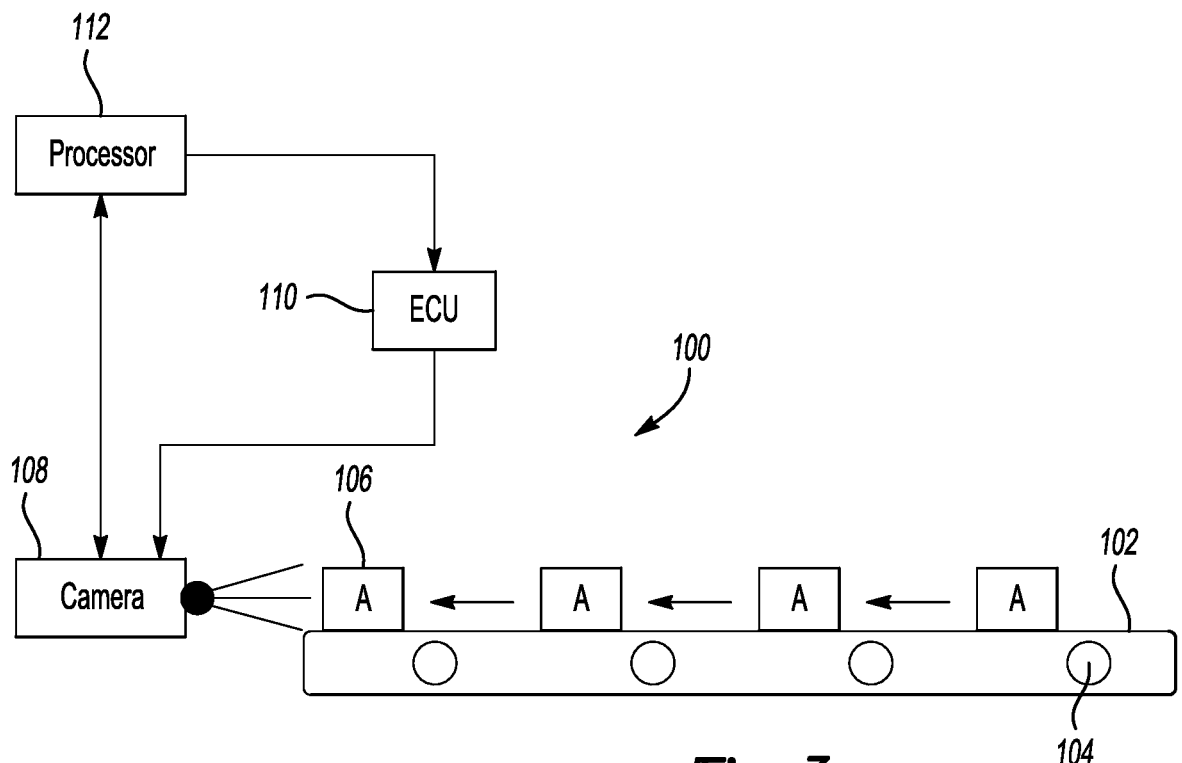
FIG. 3 depicts a generalized apparatus and assembly of the inspection system with a side-facing camera according to one or more embodiments shown and described herein.

The functionality and steps as described above is applied to the system 100 as illustrated in FIG. 2. In this embodiment, the camera 108 takes the reference image and the current image from an upward angle. In alternative embodiments, such as illustrated in FIG. 3, the camera takes the reference image and/or the current image from a side angle. In further alternative embodiments, the camera may be taken at different angles or multiple cameras may be provided to enhance accuracy of the current image in the reference image taken.

In further embodiments, the software and corresponding camera 108 is used to mask out areas on the reference image that may impact the quality of the current image. Specifically, the software and/or camera 108 may be used to mask out areas of the reference image that should not be part of the calculation due to the color matching. Masking is helpful in situations where there is, for example, a shiny or metallic portion that could negatively impact the functioning of the comparison of the reference image to the current image.

In other embodiments, the machine learning 204 may also be used to take in multiple reference images over the course of a day to capture all possible lighting conditions that could be encountered to make sure the part is visible. In this embodiment, a plurality of reference images are taken throughout the day to compensate for changes in ambient light, habits of opening doors and windows, and/or the time of year and corresponding light associated with that time of year. In this embodiment, a plurality of reference images could be rotated throughout the day depending on the various conditions.

Alternatively, the reference image newly taken, by example every few hours, would replace the prior reference image taken and currently used.

In additional embodiments, the machine learning 204 is used as an incremental learning system where the underlying model is updatable as new instances of data are uncovered. In this embodiment, various pieces of data such as prior camera settings, lighting, weather, time of day, time of year, and/or third party data is constantly used to update the comparison system conducted by the processor 112. This method would allow for constant learning and updating providing for the best possible and accurate comparison between a reference image and a current image, or between a model image and a reference image.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automated inspection process for inspecting imaged on a conveyor belt of an assembly line using machine learning comprising the steps of:
   storing and processing a plurality of data relating to a camera and/or image processing;
   generating a theoretical model image of an item to be inspected prior to taking a first image using the plurality of data relating to the camera and/or image processing;
   determining if the model image is within a predetermined range;
   adjusting the camera settings to match the model image;
   taking a reference image based on the model image;
   taking a current image of the item on the conveyor belt of an assembly line; and
   comparing the current image to the reference image to determine if the current image is within a predetermined range.

2. The automated inspection process of claim 1 wherein the plurality of data includes prior camera setting data.

3. The automated inspection process of claim 1 wherein the plurality of data includes weather data.

4. The automated inspection process of claim 1 wherein the plurality of data includes lighting data.

5. The automated inspection process of claim 1 wherein the plurality of data includes time of day data.

6. The automated inspection process of claim 1 wherein the plurality of data includes third party data.

* * * * *